(12) United States Patent
Cui et al.

(10) Patent No.: US 9,952,889 B2
(45) Date of Patent: Apr. 24, 2018

(54) CONNECTION MANAGEMENT (71) Applicant: Nutanix, Inc., San Jose, CA (US)

(72) Inventors: Miao Cui, New York, NY (US); Robert Schwenz, San Jose, CA (US); Gregory A. Smith, Oakland, CA (US)

(73) Assignee: Nutanix, Inc., San Jose, CA (US)

( * ) Notice: Subject to any disclaimer, the term of this patent is extended or adjusted under 35 U.S.C. 154(b) by 127 days.

(21) Appl. No.: 14/938,726

(22) Filed: Nov. 11, 2015

(65) Prior Publication Data

US 2017/0132029 A1 May 11, 2017

(51) Int. Cl.
*G06F 9/45* (2006.01)
*G06F 9/455* (2018.01)
*G06F 13/368* (2006.01)

(52) U.S. Cl.
CPC ........ *G06F 9/45558* (2013.01); *G06F 13/368* (2013.01); *G06F 2009/45579* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| 8,601,473 | B1 | 12/2013 | Aron et al. | |
|---|---|---|---|---|
| 2016/0065450 | A1* | 3/2016 | McAllister | H04L 12/4633 370/218 |
| 2016/0191688 | A1* | 6/2016 | Chalouhi | G06F 17/30867 455/420 |
| 2017/0031699 | A1* | 2/2017 | Banerjee | G06F 9/45558 |

* cited by examiner

*Primary Examiner* — Emerson Puente
*Assistant Examiner* — Steven Do
(74) *Attorney, Agent, or Firm* — Foley & Lardner LLP (57) ABSTRACT

In one embodiment, a system for managing communication connections in a virtualization environment, comprises a plurality of host machines implementing a virtualization environment, wherein each of the host machines comprises a hypervisor, at least one user virtual machine (UVM), a connection agent, and an I/O controller; and a virtual disk comprising a plurality of storage devices, the virtual disk being accessible by all of the I/O controllers, wherein the I/O controllers conduct I/O transactions with the virtual disk based on I/O requests received from the UVMs, and wherein, for each of the host machines: each of the UVMs on the host machine sends its respective I/O requests to a selected one of the I/O controllers, and for each of the UVMs on the host machine, the connection agent on the host machine selected one of the I/O controllers for the UVM based on a list of the available I/O controllers.

20 Claims, 10 Drawing Sheets

CONNECTION MANAGEMENT

TECHNICAL FIELD

This disclosure generally relates to connection management within a virtualization environment.

BACKGROUND

A "virtual machine" or a "VM" refers to a specific software-based implementation of a machine in a virtualization environment, in which the computing resources of a physical host machine (e.g., CPU, memory, etc.) are virtualized or transformed into the underlying support for the fully functional virtual machine that can run its own operating system and applications on the underlying computing resources just like a real computer.

Virtualization works by inserting a thin layer of software directly on the computer hardware or on a host operating system. This layer of software contains a virtual machine monitor or "hypervisor" that allocates the computing resources of the physical host machine dynamically and transparently to create and run one or more virtual machines. Multiple operating systems may thereby run concurrently on a single physical host machine and share computing resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single physical host machine, with each having access to the computing resources it needs when it needs them.

Virtualization allows one to run multiple virtual machines on a single physical host machine, with each virtual machine sharing the computing resources of that one physical host machine across multiple environments. Different virtual machines can run different operating systems and multiple applications on the same physical host machine.

One reason for the broad adoption of virtualization in modern business and computing environments is because of the resource utilization advantages provided by virtual machines. Without virtualization, if a physical host machine is limited to a single dedicated operating system, then during periods of inactivity by the dedicated operating system the physical machine is not utilized to perform useful work. This is wasteful and inefficient if there are users on other physical host machines which are currently waiting for computing resources. To address this problem, virtualization allows multiple VMs to share the underlying computing resources of the physical host machine so that during periods of inactivity by one VM, other VMs can take advantage of the resource availability to process workloads. This can produce great efficiencies for the utilization of physical host machines, and can result in reduced redundancies and better resource cost management.

Furthermore, there are now products that can aggregate multiple physical host machines into a larger system and run virtualization environments, not only to utilize the computing resources of the physical host machines, but also to aggregate the storage resources of the individual physical host machines to create a logical storage pool. With such a storage pool, the data may be distributed across multiple physical host machines in the system but appear to each virtual machine to be part of the physical host machine that the virtual machine is hosted on. Such systems may use metadata to locate the indicated data; the metadata itself may be distributed and replicated any number of times across the system. These systems are commonly referred to as clustered systems, wherein the resources of a cluster of nodes (e.g., the physical host machines) are pooled to provide a single logical system.

SUMMARY OF PARTICULAR EMBODIMENTS

Embodiments of the present invention provide an architecture for managing I/O operations and storage devices for a virtualization environment. According to some embodiments, a Controller/Service VM is employed to control and manage any type of storage device, including direct-attached storage in addition to network-attached and cloud-attached storage. The Controller/Service VM implements the Storage Controller logic in the user space, and with the help of other Controller/Service VMs running on physical host machines in a cluster, virtualizes all storage resources of the various physical host machines into one global logically-combined storage pool that is high in reliability, availability, and performance. Each Controller/Service VM may have one or more associated I/O controllers for handling network traffic between the Controller/Service VM and the storage pool.

In particular embodiments, connection agents monitor the status of I/O controllers and direct network traffic from User VMs to specific Controller/Service VMs by way of their I/O controllers. A User VM may send a request to a connection agent on its node in order to find an appropriate I/O controller to connect to. The connection agent may then respond with an identification of a specific I/O controller with which the User VM may establish a connection and conduct I/O transactions. The User VM may then establish a connection with the I/O controller for the Controller/Service VM and send its I/O request(s) to the Controller/Service VM. In some embodiments, the connection agent may identify a designated default I/O controller whenever the local I/O controller is available. In a failover scenario, the connection agent may select a particular remote I/O controller while continuing to monitor all I/O controllers; once the designated default I/O controller is available again, the connection agent may notify the User VM of the availability of the designated default I/O controller, at which point the User VM may terminate any connections between the User VM and remote I/O controllers and re-establish a connection to the designated default I/O controller.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Embodiments of the present invention provide an architecture for managing I/O operations and storage devices for a virtualization environment. According to some embodiments, a Controller/Service VM is employed to control and manage any type of storage device, including direct-attached storage in addition to network-attached and cloud-attached storage. The Controller/Service VM implements the Storage Controller logic in the user space, and with the help of other Controller/Service VMs running on physical host machines in a cluster, virtualizes all storage resources of the various physical host machines into one global logically-combined storage pool that is high in reliability, availability, and performance. Each Controller/Service VM may have one or more associated I/O controllers for handling network traffic between the Controller/Service VM and the storage pool.

In particular embodiments, connection agents monitor the status of I/O controllers and direct network traffic from User VMs to specific Controller/Service VMs by way of their I/O controllers. A User VM may send a request to a connection agent on its node in order to find an appropriate I/O controller to connect to. The connection agent may then respond with an identification of a specific I/O controller with which the User VM may establish a connection and conduct I/O transactions. The User VM may then establish a connection with the I/O controller for the Controller/Service VM and send its I/O request(s) to the Controller/Service VM. In some embodiments, the connection agent may identify a designated default I/O controller whenever the local I/O controller is available. In a failover scenario, the connection agent may select a particular remote I/O controller while continuing to monitor all I/O controllers; once the designated default I/O controller is available again, the connection agent may notify the User VM of the availability of the designated default I/O controller, at which point the User VM may terminate any connections between the User VM and remote I/O controllers and re-establish a connection to the designated default I/O controller.

Figure 1:
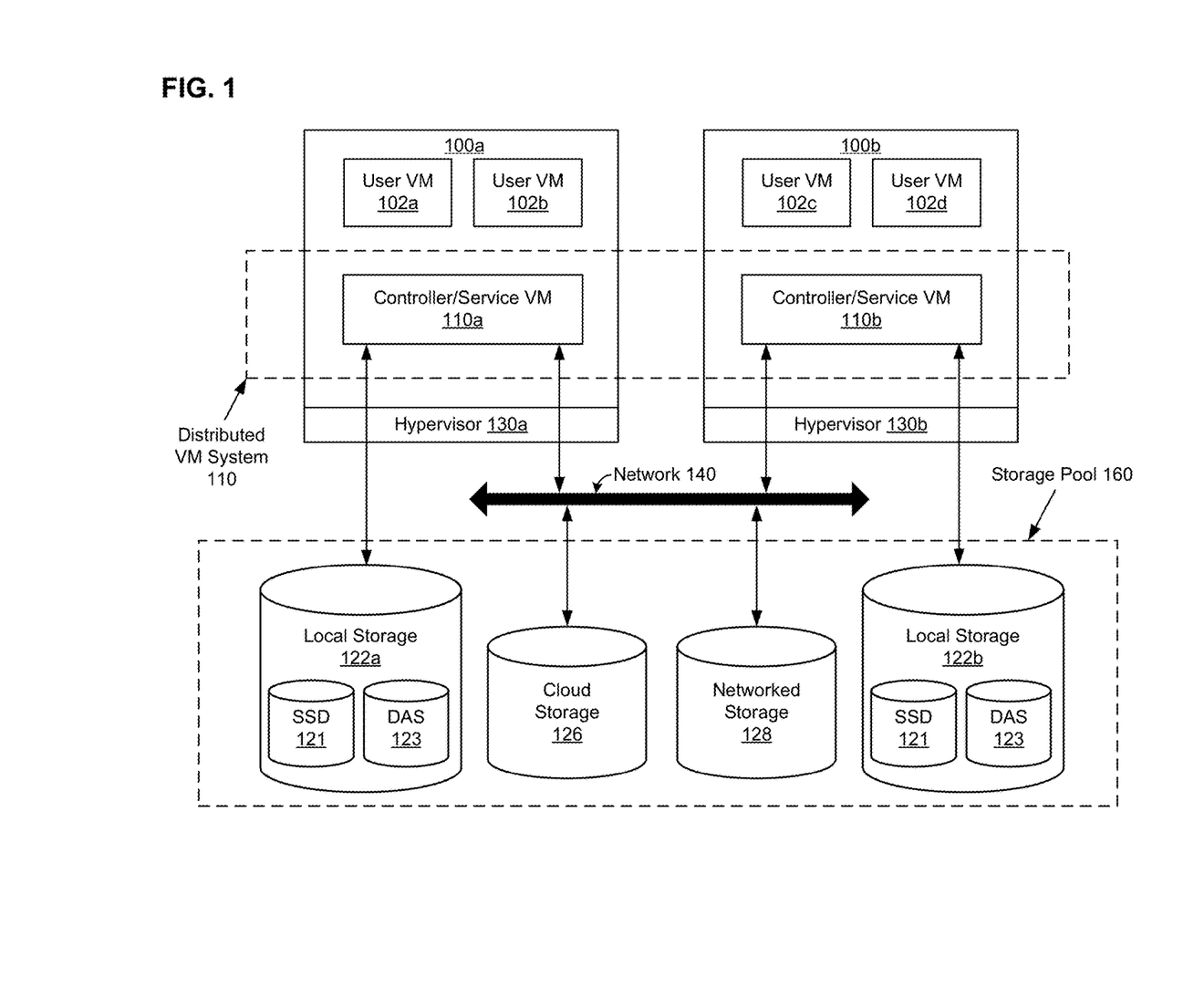
FIG. 1 illustrates a clustered virtualization environment according to some embodiments of the invention.

FIG. 1 illustrates a clustered virtualization environment according to some embodiments of the invention. The architecture of FIG. 1 can be implemented for a distributed system that includes multiple physical host machines 100a and 100b and that manages multiple tiers of storage in the storage pool. The multiple tiers of storage may include any storage resources that are accessible through a network 140, such as cloud storage 126 or network-accessible storage 128 (e.g., a storage area network or "SAN"). Particular embodiments may also incorporate local storage 122 that is within or directly attached to the server and/or appliance to be managed as part of the storage pool 160. Examples of such storage include Solid State Drives ("SSDs") 121 or Hard Disk Drives ("HDDs", a.k.a. "spindle drives") 123. These storage resources, both local and network-accessible, form a storage pool 160. Virtual disks ("vDisks") may be structured from the storage resources in the storage pool 160, as described in more detail below. As used herein, the term vDisk refers to the virtualized storage abstraction that is exposed by a Controller/Service VM for use by a user VM. In some embodiments, a vDisk may be mounted on the user VM, and an interface to the vDisk may be exposed via a protocol such as iSCSI ("internet small computer system interface"), NFS ("network file system"), or any other appropriate protocol.

Each physical host machine 100a or 100b may run virtualization software, such as VMWARE ESX(I), MICROSOFT HYPER-V, or REDHAT KVM. The virtualization software may include a hypervisor 130a/130b to create user VMs 102 and manage the interactions between the underlying hardware and the user VMs 102 that run client software.

A special VM 110a/110b, referred to herein as a "Controller/Service VM," may be used to manage storage and I/O activities according to some embodiments of the invention. This is the "Storage Controller" in the currently described system. Multiple such storage controllers coordinate within a cluster to form an interface to a single storage pool. The Controller/Service VMs 110 may run as virtual machines above hypervisors 130 on the physical host machines 100, and work together to form a distributed system 110 that manages all the storage resources, including the locally attached storage resources 122, the network-accessible storage resources 128, and the cloud storage resources 126. Since the Controller/Service VMs 110 run above the hypervisors 130, this means that the current approach can be used and implemented within any virtual machine architecture, since such Controller/Service VMs may be used in conjunction with any hypervisor from any virtualization vendor.

In some embodiments, each Controller/Service VM 110 exports one or more block devices or NFS server targets that appear as storage disks to the user VMs 102. These storage disks are virtual, since they are implemented by the software running inside the Controller/Service VMs 110. Thus, to the user VMs 102, the Controller/Service VMs 110 appear to be exporting a clustered storage appliance that contains some disks. All user data (including the operating system) in the client VMs 102 may reside on these vDisks.

Significant performance advantages may be gained by allowing the virtualization system to access and utilize local (e.g., server-internal) storage 122 as disclosed herein. This is because I/O performance is typically much faster when performing access to local storage 122 as compared to performing access to network-accessible storage 128 across a network 140. This faster performance for locally attached storage 122 can be increased even further by using certain types of optimized local storage devices, such as SSDs 121. Further details regarding methods and mechanisms for implementing the virtualization environment illustrated in FIG. 1 are described in U.S. Pat. No. 8,601,473, which is hereby incorporated by reference in its entirety.

Figure 2:
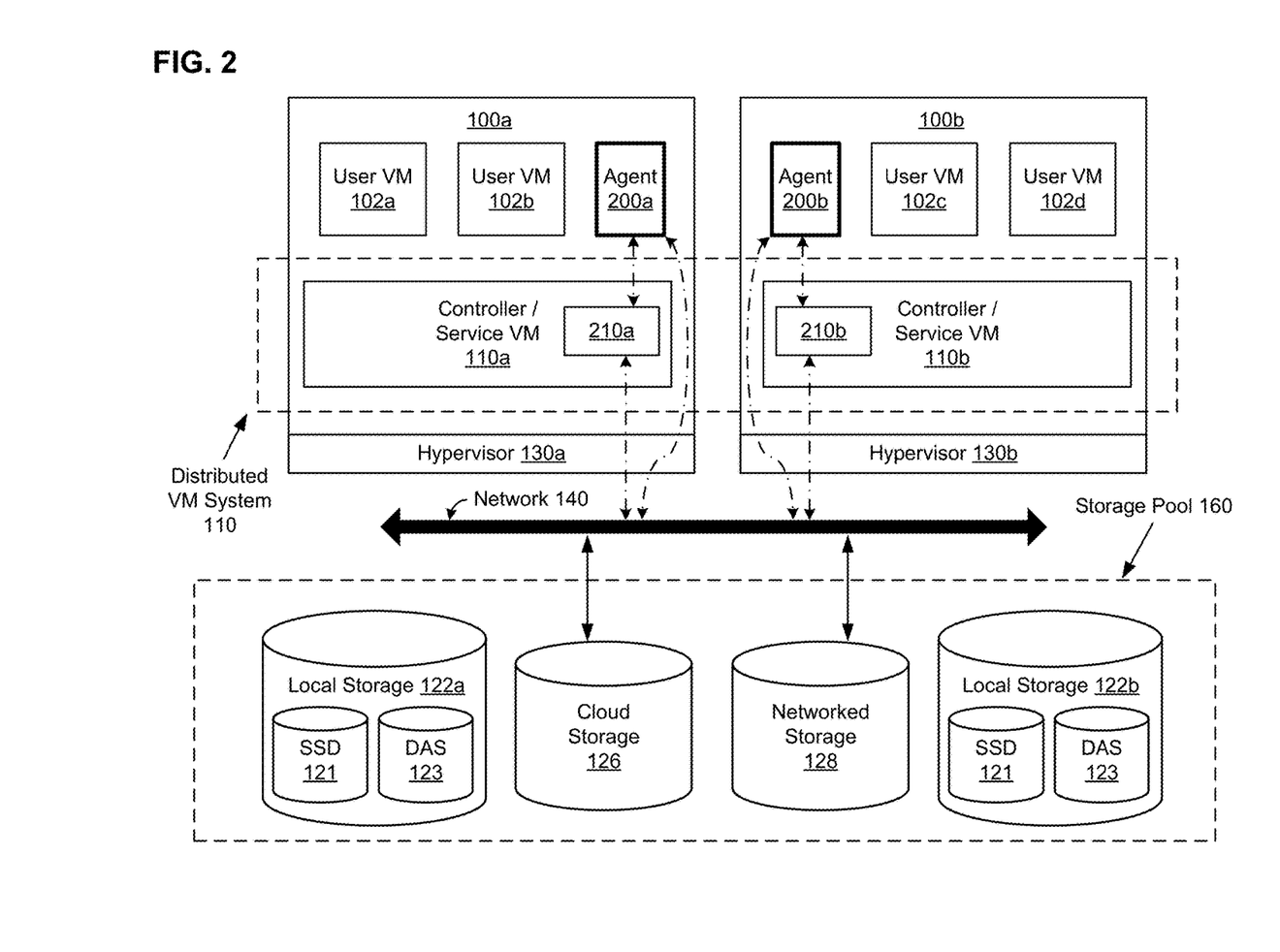
FIG. 2 illustrates a clustered virtualization environment implementing connection management according to some embodiments of the invention.

FIG. 2 illustrates a clustered virtualization environment implementing connection management according to some embodiments of the invention. Each Controller/Service VM 110 may have one or more I/O controllers 210 for handling data transmissions. Each User VM 102 may have a connection agent 200 for monitoring the status of I/O controllers 210 and directing I/O requests to an available I/O controller 210 at a Controller/Service VM 110. In particular embodiments, such I/O requests may be sent using a protocol to facilitate data transfers over intranets and to manage storage over long distances, such as, by way of example and not limitation, a transport protocol (e.g., Internet Small Computer System Interface ("iSCSI") protocol over Transmission Control Protocol (TCP)) or a distributed file system protocol (e.g., Network File System (NFS) over User Datagram Protocol (UDP)). Particular embodiments may use any Internet Protocol (IP)-based storage networking standard for linking data storage facilities and transmitting data over local area networks (LANs), wide area networks (WANs), or the Internet. Particular embodiments may also enable location-independent data storage and retrieval.

In particular embodiments, each of the connection agents 200 may maintain a list of the I/O controllers 210 that are available to handle I/O requests. Each of the connection agents 200 may poll I/O controllers 210 to determine whether each of the I/O controllers 210 are available to handle I/O requests by periodically "pinging" them (e.g., by sending an echo-request, waiting to receive an echo-response, and, if received, measuring the round-trip time from transmission to reception, reporting errors and packet loss, else if not received, generating an error message). For example, when using the iSCSI transport protocol, a connection agent 200 may periodically send a NOP-OUT request to all I/O controllers 210, with the expectation that any available I/O controllers 210 will send back an NOP-IN response within a reasonable time. In particular embodiments, the echo-response from each I/O controller may include additional information regarding the I/O controller, such as its current and/or historical load or its capabilities.

If a connection agent 200 receives no response from one of the I/O controllers 210 within a maximum response time, the connection agent 200 may mark the I/O controller 210 as being unavailable. If the unavailable I/O controller 210 subsequently responds to a future echo-request, the connection agent 200 may mark the I/O controller 210 as being available again. In particular embodiments, the connection agent 200 may ping all of the I/O controllers 210. In some embodiments, the connection agent 200 may ping only a subset of the I/O controllers 210.

Each connection agent 200 may then use the list of available I/O controllers to direct network traffic from User VMs 102 to specific Controller/Service VMs 110. A User VM 102 may send a request to a connection agent 200 on its node in order to find an appropriate I/O controller 210 to connect to. The connection agent 200 may then respond with an identification of an I/O controller 210 for a specific Controller/Service VM 110 to which the User VM 102 may establish a connection and send an I/O request. The User VM 102 may then send an I/O request to the specified I/O controller 210. For example, when using the iSCSI transport protocol, the iSCSI initiator (the User VM) may send a login request to the connection agent 200, which sends back a redirection response (e.g., using the "Target moved temporarily" (0x0101) status code) specifying the address of the iSCSI target (the specific I/O controller 210 for a particular Controller/Service VM 110).

In some embodiments, as a general policy, the connection agent 200 may send such requests to a designated default I/O controller 200 for that particular connection agent 200 (e.g., the local I/O controller on the same physical host machine as the connection agent 200) whenever the designated default I/O controller 200 is available. In some embodiments, a different I/O controller 200 may be designated as the default for each connection. If the list of available I/O controllers 200 indicates that the designated default I/O controller 200 is not available, the connection agent 200 may select one of the known available remote I/O controllers 200 and send a temporary redirect instruction for the User VM to establish a connection to the selected remote I/O controller 200. The connection agent 200 then continues to monitor all I/O controllers 200, and once the designated default I/O controller 200 is available again, the connection agent 200 may send an instruction to terminate any connections between the User VM and any remote I/O controllers 200 and thereby re-establish a connection to the designated default I/O controller 200. For example, when using the iSCSI transport protocol, the connection agent 200 may terminate the connection (e.g., by sending a tcpkill command) between the User VM 102 and the remote I/O controller 210. Upon determining that the connection has failed, the User VM 102 may send another request to the connection agent 200 to find an appropriate I/O controller 210 to connect to, whereupon the connection agent 200 will send back an identification of the I/O controller 210 for the designated default I/O controller 200.

FIG. 3 and FIGS. 4A-4F illustrate an example method and different example use cases for connection management in a virtualization environment according to some embodiments of the invention. At step 300, connection agent 200b monitors and tracks the status of I/O controllers 210. Connection agent 200b may send an echo-request (e.g., a NOP-OUT request) to each of the I/O controllers 210, and if any of the I/O controllers 210 fails to respond within a threshold period of time (e.g., by sending back a NOP-IN response within 1 second), connection agent 200b may update its status list to indicate that the unresponsive I/O controller 210 is unavailable.

At step 305, user VM 102b may send a request (illustrated in FIG. 4A by a dotted line) to the connection agent on its node (connection agent 200a on server node 100a) for an I/O connection (e.g., by sending an iSCSI login request).

At step 310a, connection agent 200a responds (illustrated in FIG. 4B by a dotted line) with an identification of a specific I/O controller to handle I/O requests for user VM 102b (e.g., by sending back an iSCSI redirection response specifying the address of local I/O controller 210a, which is the designated default I/O controller for user VM 102b). In some embodiments, the connection agent may select the user VM's designated default I/O controller whenever it is available. If the User VM indicates that the local I/O controller is not available, the connection agent may select one of the known available remote I/O controllers and send a temporary redirect instruction for the User VM to establish a connection to the selected remote I/O controller.

At step 310b, user VM 102b may then establish a TCP connection (illustrated in FIG. 4B by a solid line) with the designated default I/O controller 210a and send an I/O request to the designated default I/O controller. At step 315, the designated default I/O controller may transmit data from user VM 102b to storage pool 160 (via network 140) and vice versa as needed to handle I/O requests from user VM 102b. In particular embodiments, the I/O controller may handle not only requests to remote storage repositories such as cloud storage 126 and networked storage 128, but also local storage 122a.

Figure 4A:
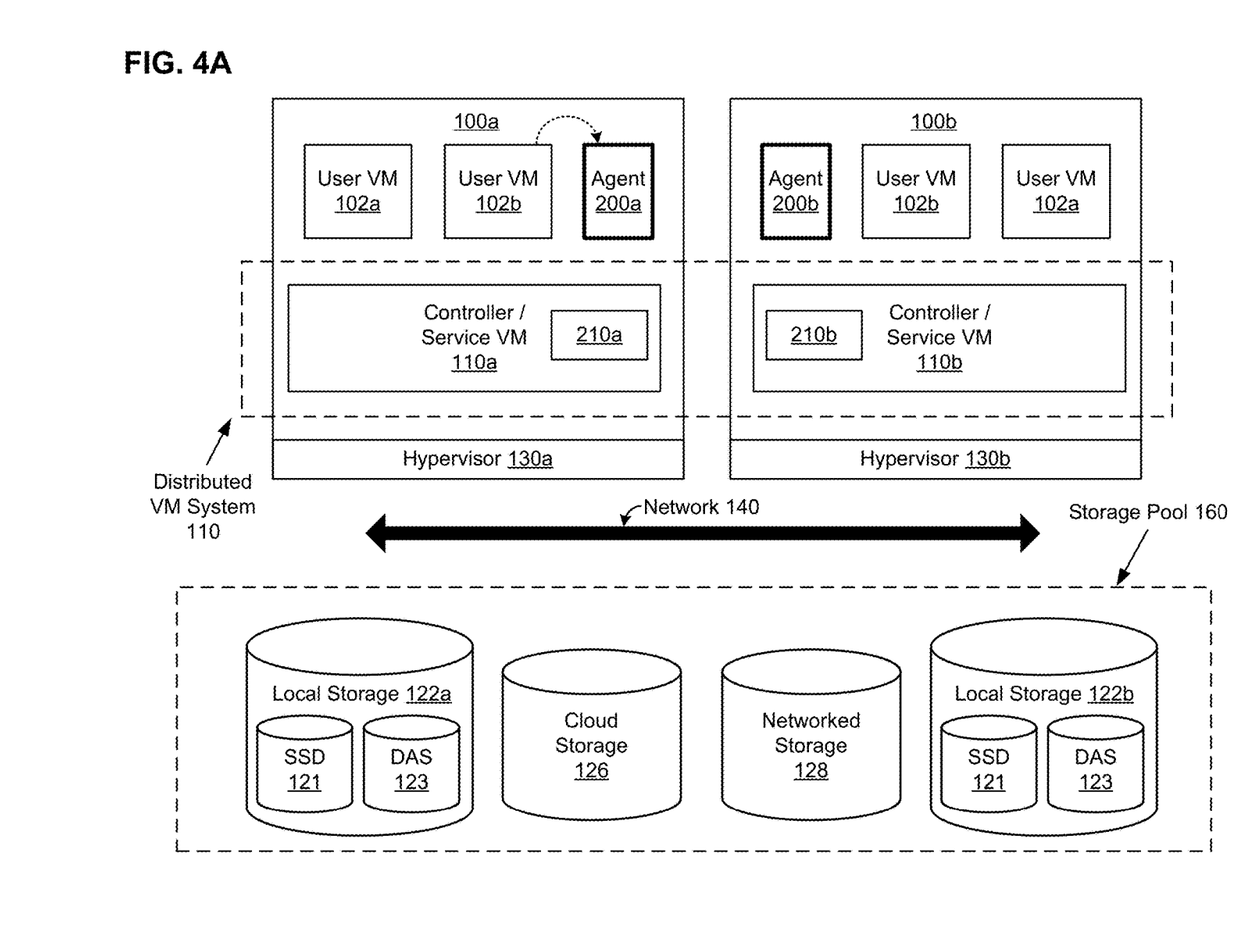
FIGS. 4A-4F illustrate different use cases for connection management according to some embodiments of the invention.
Figure 4B:
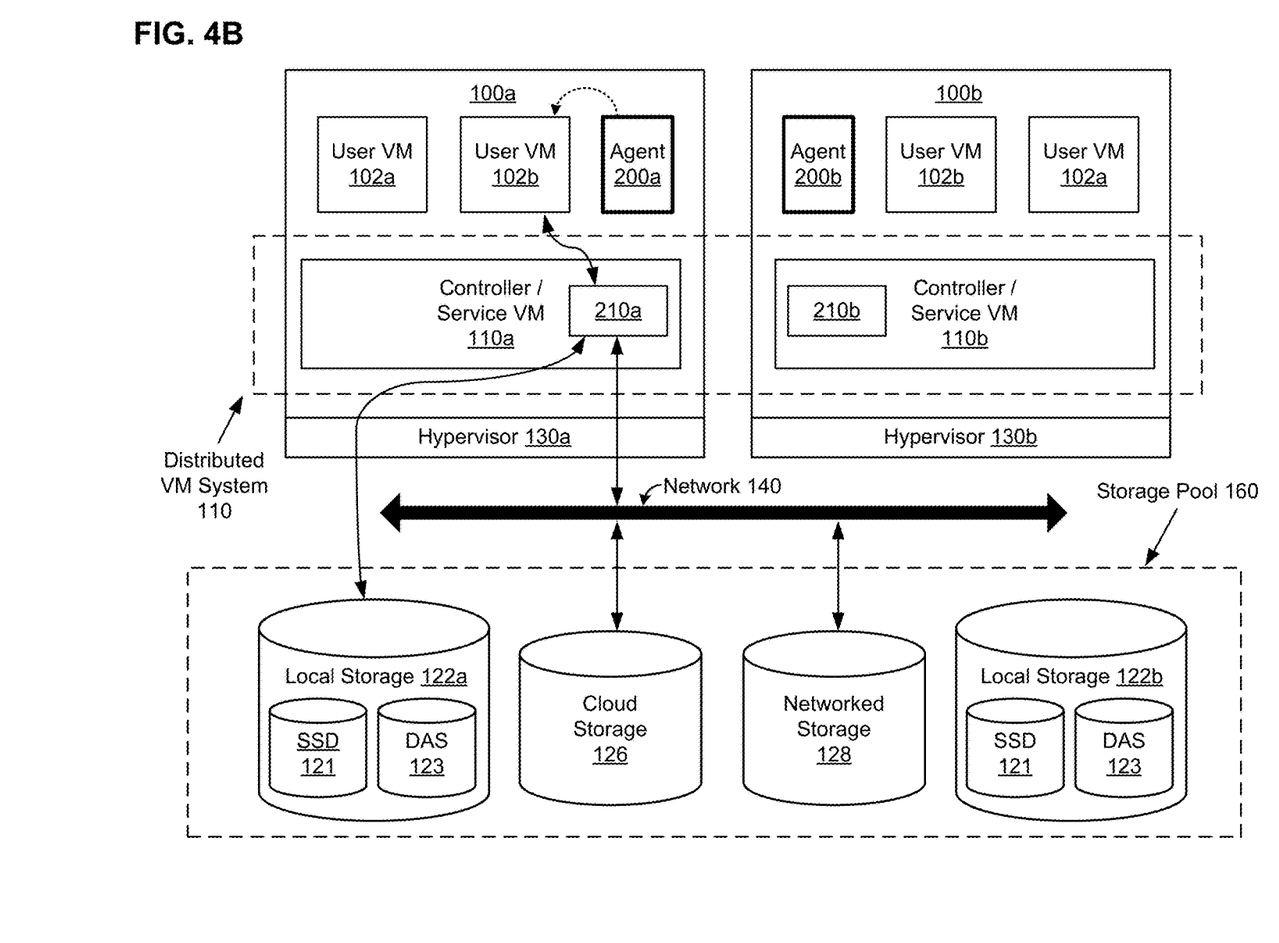
Figure 4C:
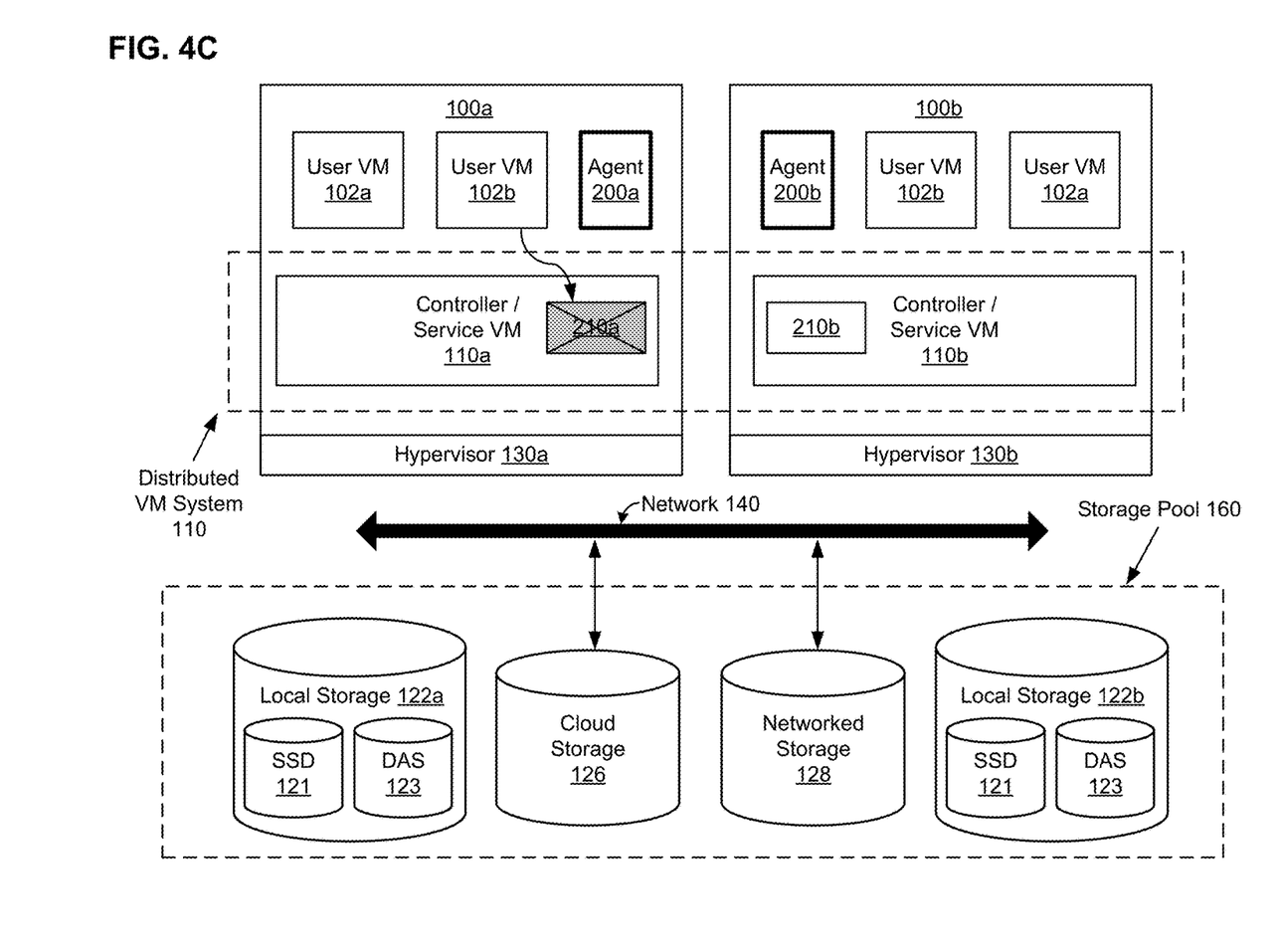

As illustrated in FIG. 4C, I/O controller 210a may become unavailable and fail to respond to user VM 102b within a maximum threshold duration of time. At step 320a, user VM 102b may determine that the connection to the designated default I/O controller (local I/O controller 210a) has failed, and then, at step 320b, user VM 102b may send another request for an I/O connection to connection agent 200a (illustrated in FIG. 4D by a dotted line).

Figure 3:
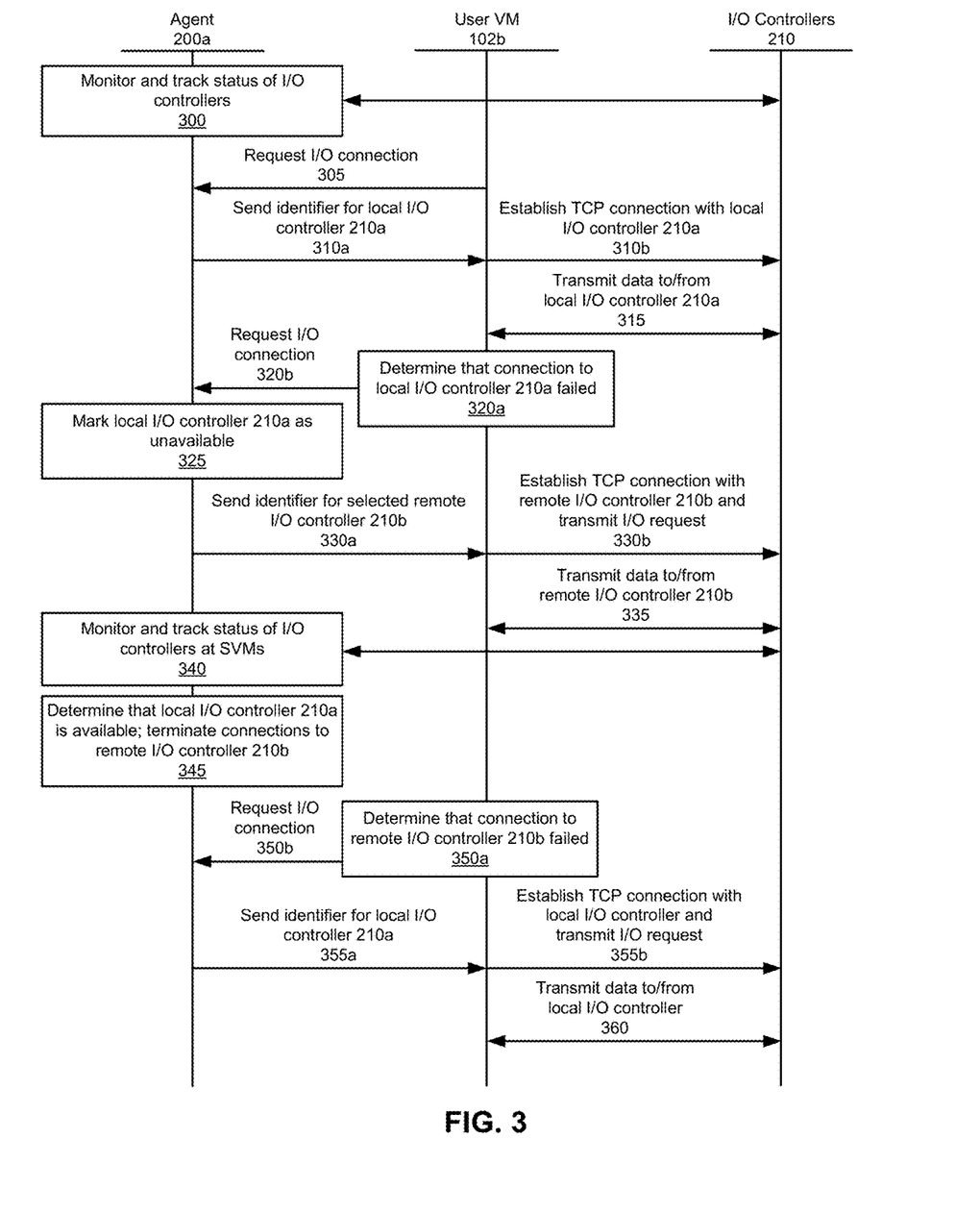
FIG. 3 illustrates an example method for connection management according to some embodiments of the invention.

At step 325, connection agent 200a may mark the designated default I/O controller as unavailable and select another I/O controller from the list of currently available I/O controllers to handle I/O requests for user VM 102b. In particular embodiments, prior to updating the status of the I/O controller 210 to indicate that the I/O controller 210 is unavailable, connection agent 200a may confirm whether the I/O controller 210 is unavailable by sending an echo-request to the I/O controller and waiting to receive an echo-response. In some embodiments, if connection agent 200a receives an additional request (e.g., from another user VM) to identify an available I/O controller while connection agent 200a is waiting to receive an echo-response, connection agent 200a may delay responding to the additional request until the status of the I/O controller has been confirmed. In some embodiments, if connection agent 200a receives an additional request (e.g., from another user VM) to identify an available I/O controller while connection agent 200a is waiting to receive an echo-response, connection agent 200a may simply select another I/O controller.

In particular embodiments, connection agent 200a may also mark an I/O controller as being unavailable if, when pinging the I/O controller, the I/O controller fails to respond within a maximum threshold duration of time (e.g., when the connection agent sends an echo-request to the I/O controller, the I/O controller fails to send back an echo-response within one second). In particular embodiments, the maximum threshold duration of time (for an I/O controller to either send a response to a user VM or to a connection agent) may be configurable in accordance with the particular cluster configuration.

At step 330a, connection agent 200a may send user VM 102b (also illustrated in FIG. 4D by a dotted line) an identification of a different I/O controller to handle I/O requests for user VM 102b (e.g., by sending back an iSCSI redirection response specifying the address of remote I/O controller 210b). The different I/O controller may be selected in any conventional manner, such as, by way of example and not limitation, a round-robin algorithm, a least-recently used algorithm, the I/O controller with the lightest load at the time, or random selection.

Figure 4D:
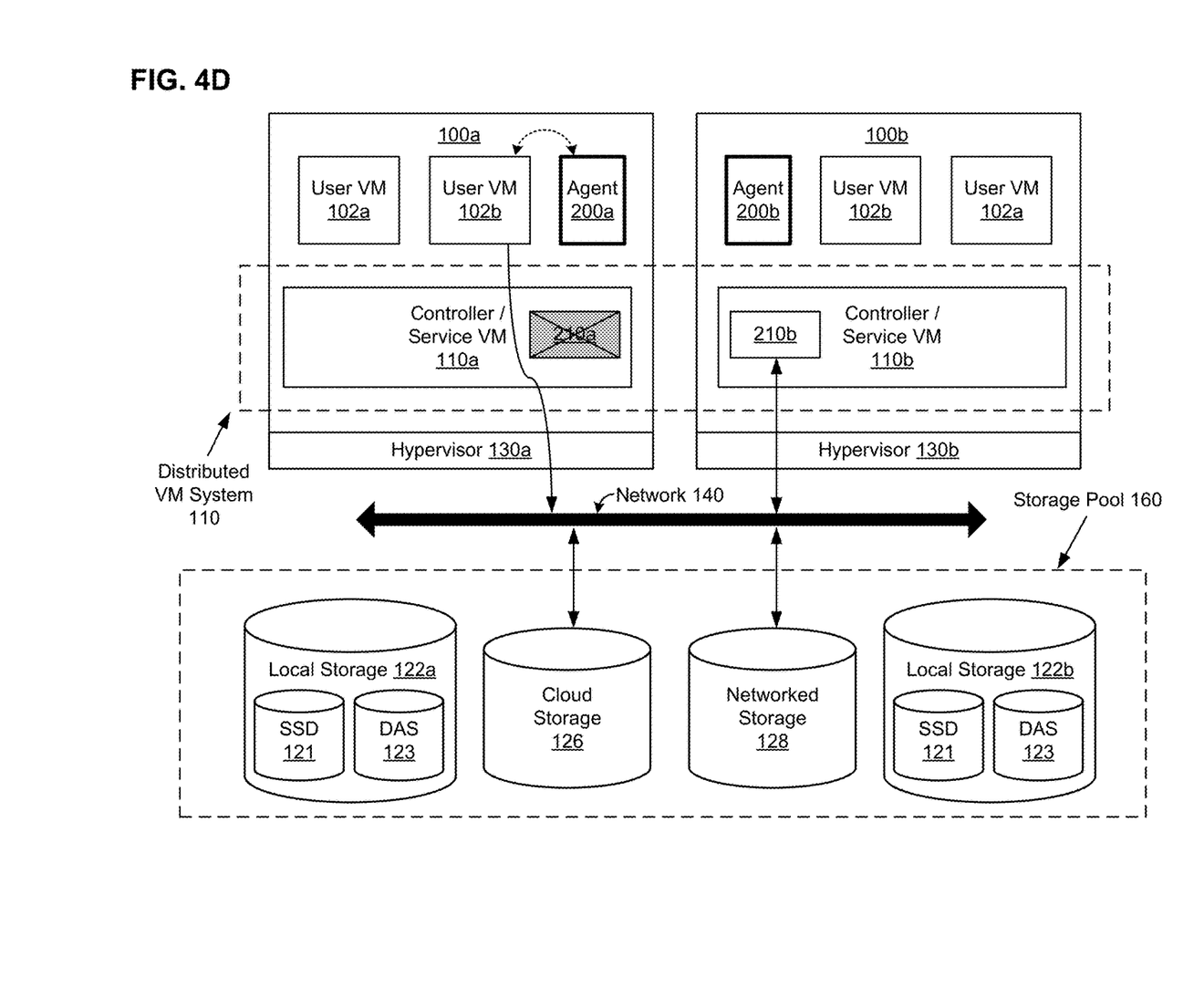
Figure 4E:
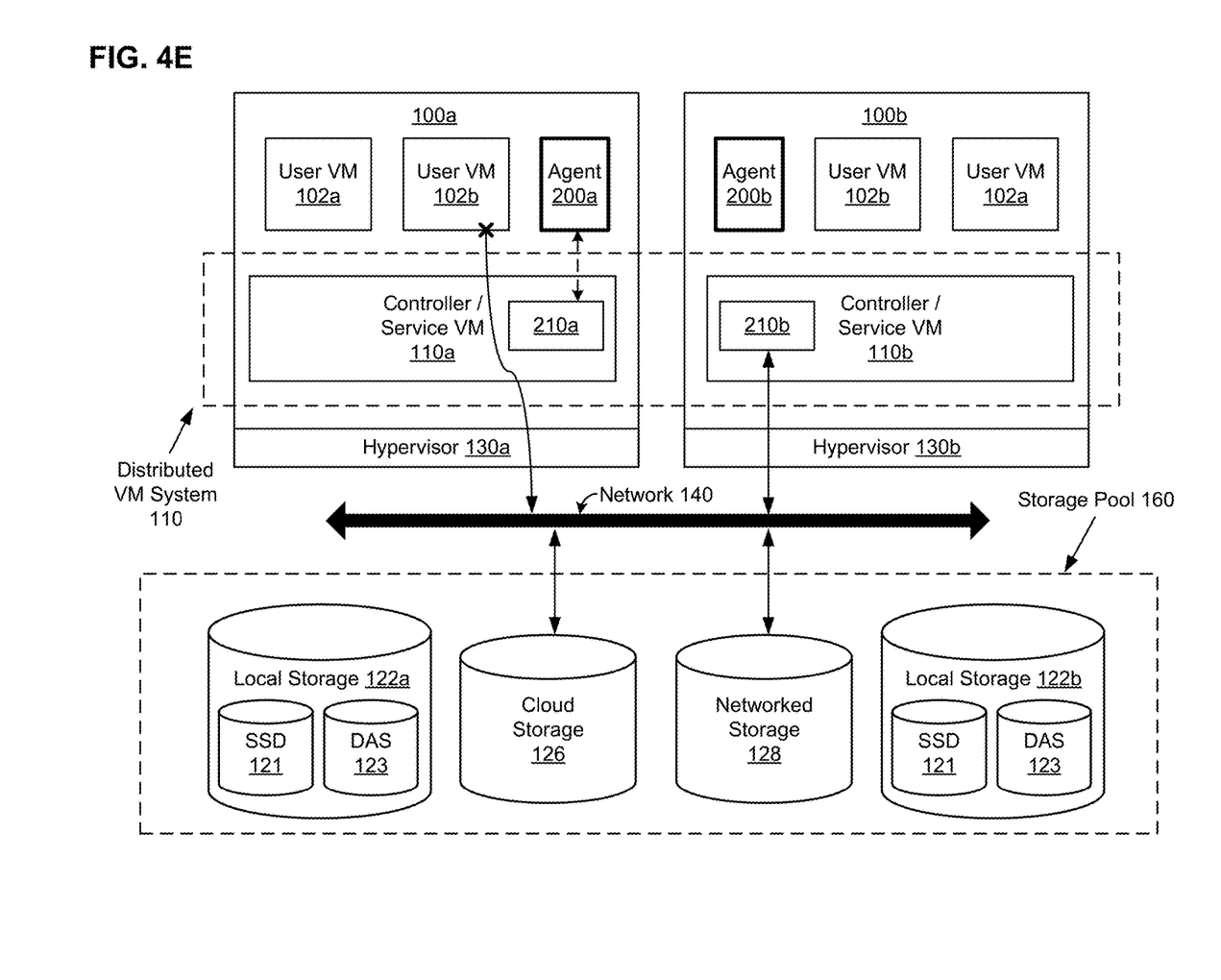

At step 330b, user VM 102b may then establish a TCP connection with I/O controller 210b and send an I/O request to I/O controller 210b (illustrated in FIG. 4D by a solid line). At step 335, I/O controller 210b transmits data (illustrated in FIG. 4D by a solid line) from user VM 102b to storage pool 160 (via network 140) and vice versa as needed to handle I/O requests from user VM 102b. In some embodiments, any TCP connections with remote I/O controllers may be maintained only on a transaction by transaction basis; in some embodiments, the TCP connection may be maintained for the duration of a session.

At step 340, connection agent 200a continues to monitor and track the status of all I/O controllers. At step 345, upon determining that I/O controller 210a is available again, connection agent 200a may update its list of available I/O controllers and terminate the connection between user VM 102b and remote I/O controller 210b (shown in FIG. 4E). In some embodiments, a policy may require that each user VM be directed to use an I/O controller available on its own physical host machine, whenever possible.

Figure 4F:
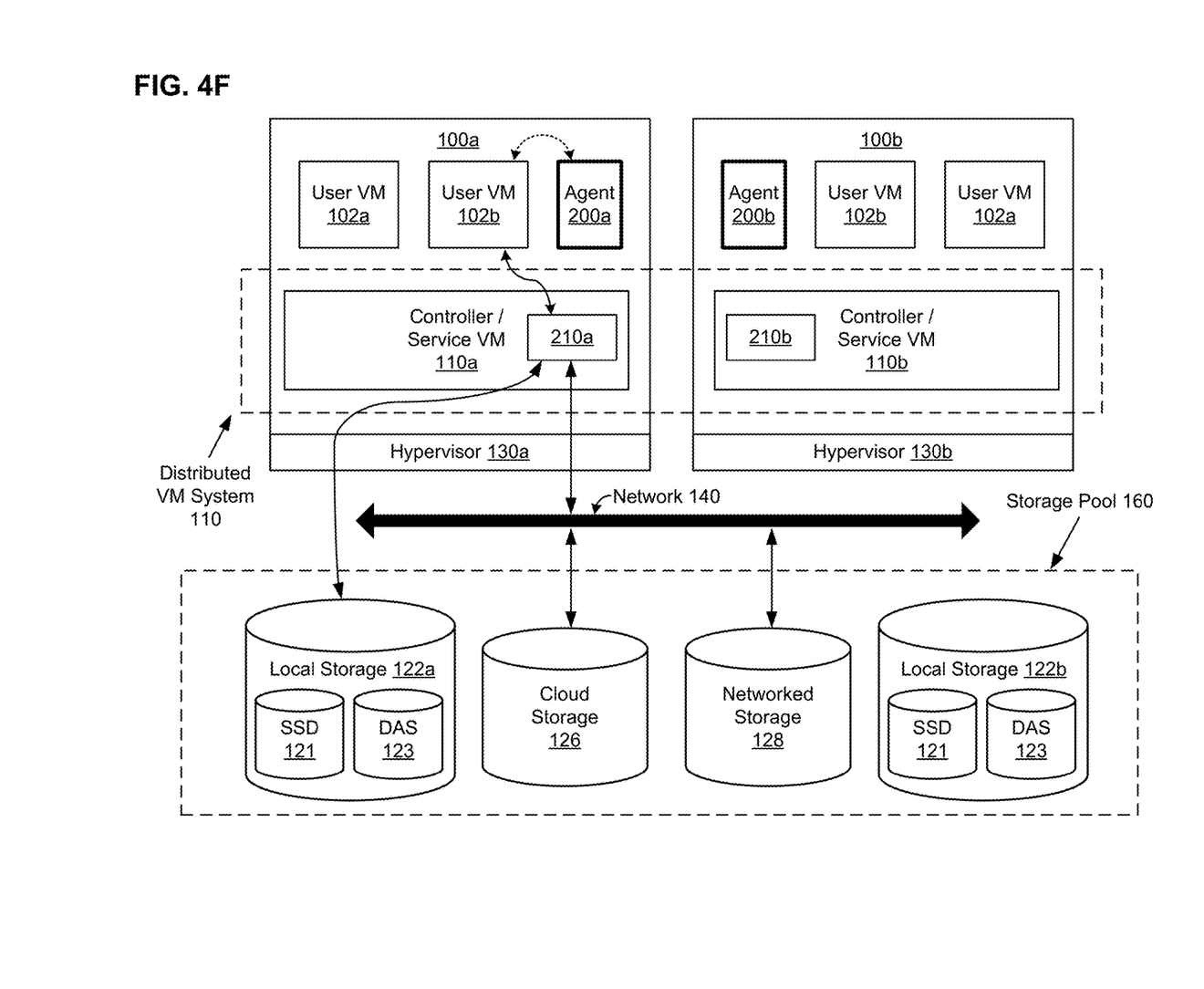

At step 350a, user VM 102b may determine that its connection to remote I/O controller 210b has failed, and then, at step 350b send another request to connection agent 2001 for an I/O connection (illustrated in FIG. 4F by a dotted line). At step 355a, connection agent 200a may send user VM 102b (also illustrated in FIG. 4F by the dotted line) an identification of the designated default I/O controller to handle I/O requests for user VM 102b (e.g., by sending back an iSCSI redirection response specifying the address of local I/O controller 210a).

At step 355b, user VM 102b may re-establish a connection (illustrated in FIG. 4F by a solid line) to the designated default I/O controller (I/O controller 210a) resident on the same physical host machine as the user VM. At step 360, the designated default I/O controller resumes transmitting data from user VM 102b to storage pool 160 (illustrated in FIG. 4F by a solid line) and vice versa as needed to handle I/O requests from user VM 102b.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for connection management including the particular steps of the method of FIG. 3, this disclosure contemplates any suitable method for connection management including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 5:
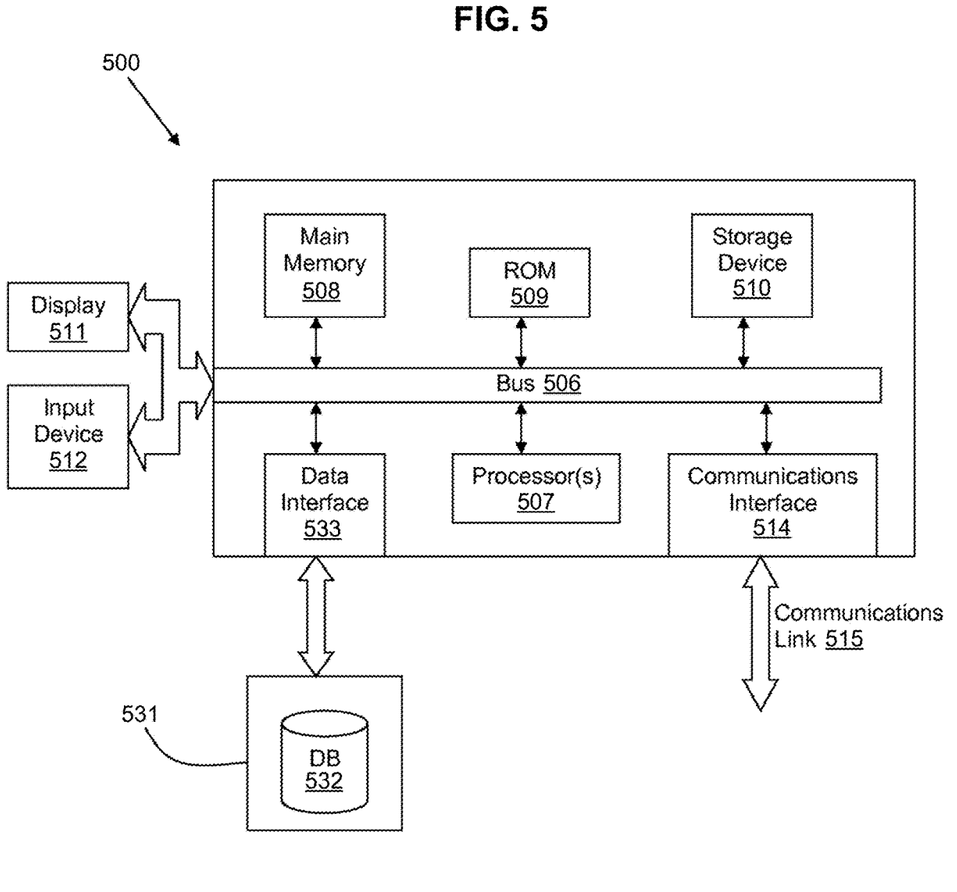
FIG. 5 illustrates a block diagram of a computing system suitable for implementing an embodiment of the present invention.

FIG. 5 is a block diagram of an illustrative computing system 500 suitable for implementing an embodiment of the present invention. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

Computer system 500 includes a bus 506 (e.g., an address bus and a data bus) or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), display 511 (e.g., CRT, LCD, LED), input device 512 (e.g., keyboard, keypad, mouse, microphone). In particular embodiments, computer system 500 may include one or more of any such components.

According to one embodiment of the invention, computer system 500 performs specific operations by processor 507 executing one or more sequences of one or more instructions contained in system memory 508. Such instructions may be read into system memory 508 from another computer readable/usable medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 507 for execution. Such a medium may take many forms, including but not limited to, nonvolatile media and volatile media. Non-volatile media includes, for example, optical or magnetic disks, such as disk drive 510. Volatile media includes dynamic memory, such as system memory 508.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution. A database 532 in a storage medium 531 may be used to store data accessible by the system 500 by way of data interface 533.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system for managing communication connections in a virtualization environment, comprising:
a plurality of host machines implementing a virtualization environment, wherein each of the plurality of host machines comprises a hypervisor, at least one user virtual machine (UVM), a connection agent, and an I/O controller; and
a virtual disk comprising a plurality of storage devices, the virtual disk being accessible by the I/O controllers of each of the plurality of host machines to conduct I/O transactions with the virtual disk, wherein:
the connection agent of each of the plurality of host machines is configured to maintain a list of all of the I/O controllers that are available from the plurality of host machines; and
the connection agent is configured to select one of the I/O controllers on the list in response to receiving an I/O request from the at least one UVM and direct the I/O request to the selected one of the I/O controllers.

2. The system of claim 1, wherein the connection agent of each of the plurality of host machines monitors and tracks a status of the I/O controllers and updates the list as availability of each of the I/O controllers changes.

3. The system of claim 2, wherein the connection agent monitors the status of the I/O controllers by periodically sending an echo-request to each of the I/O controllers, and wherein the connection agent tracks the status of the I/O controllers based on whether each of the I/O controllers sends back an echo-response within a maximum threshold duration of time.

4. The system of claim 1, wherein, in response to receiving an indication that the selected one of the I/O controllers is unavailable from the at least one UVM sending the I/O request to the selected one of the I/O controllers, the connection agent updates the list to indicate that the selected one of the I/O controllers is unavailable.

5. The system of claim 4, wherein, prior to updating the list, the connection agent verifies unavailability of the selected one of the I/O controllers by pinging the selected one of the I/O controllers.

6. The system of claim 4, wherein the connection agent selects a different one of the I/O controllers from the list and directs the I/O request to the different one of the I/O controllers.

7. The system of claim 1, wherein the connection agent is configured to select a designated default I/O controller whenever the designated default I/O controller is indicated as available on the list.

8. The system of claim 7, wherein the designated default I/O controller is the I/O controller running on a host machine on which the connection agent and the at least one UVM sending the I/O request are also running.

9. The system of claim 7, wherein, if the selected one of the I/O controllers is not the designated default I/O controller, upon determining that the designated default I/O controller is available, the connection agent terminates any connections to the selected one of the I/O controllers and establishes a connection with the designated default I/O controller.

10. One or more computer-readable non-transitory storage media embodying software for managing communication connections in a virtualization environment, the media comprising instructions operable when executed to:
provide a virtualization environment for a plurality of host machines, wherein each of the plurality of host machines comprises a hypervisor, at least one user virtual machine (UVM), a connection agent, and an I/O controller;
provide a virtual disk comprising a plurality of storage devices, the virtual disk being accessible by the I/O controllers of each of the plurality of host machines to conduct I/O transactions with the virtual disk,
maintain a list by the connection agent of all of the I/O controllers that are available from the plurality of host machines; and
select one of the I/O controllers on the list in response to receiving an I/O request from the at least one UVM and direct the I/O request to the selected one of the I/O controllers.

11. The media of claim 10, further comprising instructions operable when executed to:
by the connection agent, monitor and track a status of the I/O controllers across all of the plurality of host machines and update the list as availability of each of the I/O controllers changes.

12. The media of claim 11, wherein the connection agent monitors the status of the I/O controllers by periodically sending an echo-request to each of the I/O controllers, and wherein the connection agent tracks the status of the I/O controllers based on whether each of the I/O controllers sends back an echo-response within a maximum threshold duration of time.

13. The media of claim 10, wherein, in response to receiving an indication that the selected one of the I/O controllers is unavailable from the at least one UVM sending the I/O request to the selected one of the I/O controllers, further comprising instructions operable when executed to:
by the connection agent, update the list to indicate that the selected one of the I/O controllers is unavailable.

14. The media of claim 13, further comprising instructions operable when executed to:
by the connection agent, prior to updating the list, verify unavailability of the selected one of the I/O controllers by pinging the selected one of the I/O controllers.

15. The media of claim 13, further comprising instructions operable when executed to:
by the connection agent, select a different one of the I/O controllers from the list and direct the I/O request to the different one of the I/O controllers.

16. The media of claim 10, wherein the connection agent is biased to selecting a designated default I/O controller whenever that designated default I/O controller is indicated as available on the list.

17. The media of claim 16, wherein the designated default I/O controller is the I/O controller running on a host machine on which the connection agent and the at least one UVM sending the I/O request are also running.

18. The media of claim 16, wherein, if the selected one of the I/O controllers is not the designated default I/O controller, further comprising instructions operable when executed to:
by the connection agent, terminate any connections to the selected one of the I/O controllers and establish a connection with the designated default I/O controller.

19. A method comprising:
compiling, by a connection agent, a list of all available I/O controllers from a plurality of host machines, wherein the connection agent resides on a host machine of the plurality of host machines implemented in a virtualization environment, and wherein each of the plurality of plurality of host machines comprises a hypervisor, at least one user virtual machine (UVM), the connection agent, and an I/O controller;
receiving, by the connection agent, an I/O request from one of the at least one UVM that resides on the host machine with the connection agent;
selecting, by the connection agent, a selected I/O controller from the list of available I/O controllers for directing the I/O request to the selected I/O controller; and
updating, by the connection agent, the list of available I/O controllers as availability of each of the I/O controller on each of the plurality of host machines changes.

20. The method of claim 19, further comprising selecting a designated default I/O controller as the selected I/O controller, wherein the designated default I/O controller is the I/O controller on the host machine on which the connection agent resides.

* * * * *